United States Patent
Scott et al.

[19]

[11] Patent Number: 5,869,765
[45] Date of Patent: Feb. 9, 1999

[54] DUAL SEAL FITTING FOR ENABLING QUICK MEASUREMENT OF BRAKE CYLINDER PRESSURE

[75] Inventors: Daniel G. Scott, Pittsburgh; Gregory L. Johnston, Tarentum; Michael Veltri, Pittsburgh, all of Pa.

[73] Assignee: Westinghouse Air Brake Company, Wilmerding, Pa.

[21] Appl. No.: 901,096

[22] Filed: Jul. 28, 1997

[51] Int. Cl.[6] ...................................................... G01L 7/00
[52] U.S. Cl. .............................................................. 73/706
[58] Field of Search ............................. 73/706, 756, 707, 73/121, 129; 422/256, 257, 258, 259, 260; 210/130, 131, 132, 133, 137, 97, 136, 541; 137/599.2, 625, 560, 561 R, 625.18; 251/360, 363; 303/29

[56] References Cited

U.S. PATENT DOCUMENTS

| | | | |
|---|---|---|---|
| 3,794,071 | 2/1974 | Scott | 137/599.2 |
| 4,412,511 | 11/1983 | Firey | 123/23 |

*Primary Examiner*—William Oen
*Attorney, Agent, or Firm*—James Ray & Associates

[57] ABSTRACT

A dual seal coupling fitting enables quick measurement of pressure. The fitting includes primary and secondary valves and has one end shaped like a male portion of a quick coupler and another end screwable into a threaded bore defined in a pressure bearing housing. The fitting defines first and second cylindrical sections in communication with each other. The primary valve situates in the first section, the secondary valve in the second section. The primary valve includes a valve stem with a poppet head. A first mechanism compresses the poppet head against an outer valve seat to close the primary valve thereby preventing leakage of pressure. The secondary valve features a cylindrical seat piece and a retainer. The piece secures within the second section and defines through itself an inner bore. The piece at one end forms an inner valve seat and at an opposite end situates adjacent the first mechanism. The retainer has at one end a post approximate a terminal end of the valve stem within the inner bore. The retainer also has a check valve retained within an annular recess defined about a base of the post. A second mechanism compresses the check valve against the inner valve seat to close the secondary valve thereby further preventing leakage of pressure. Mating a female portion of a quick coupler to the male portion opens the primary and secondary valves and enables quick measurement of the pressure via a gage attached to the other end of the female portion.

21 Claims, 4 Drawing Sheets

DUAL SEAL FITTING FOR ENABLING QUICK MEASUREMENT OF BRAKE CYLINDER PRESSURE

CROSS-REFERENCE TO RELATED APPLICATIONS

This application is related to a U.S. application entitled Dual Seal Coupling Apparatus For Enabling Quick Measurement Of Brake Cylinder Pressure, Ser. No. 08/901,606, filed currently herewith on Jul. 28, 1997. The copending application is assigned to the assignee of this invention, and its teachings are incorporated into the present document by reference.

FIELD OF THE INVENTION

The present invention generally relates to a mechanism through which to gain access to a pressure to be measured. More particularly the invention relates to a dual seal fitting that allows quick measurement of brake cylinder pressure through a load sensor of empty and load freight brake equipment of a railcar.

BACKGROUND OF THE INVENTION

A typical freight train includes one or more locomotives, a plurality of railcars and a pneumatic trainline referred to as a brake pipe. The brake pipe consists of a series of individual pipe lengths interconnected to each other. One pipe length secured to the underside of each railcar interconnects to another such pipe length via a flexible coupler situated between each railcar. The brake pipe supplies the pressurized air that is required by the brake control system to charge the various reservoirs and operate the air brake equipment on each railcar in the freight train.

A train operator situated in the lead locomotive can manipulate a brake handle to apply and release the brakes on the railcars as desired. The brake handle can be moved from and in between a release position at one extreme in which brake pipe pressure is maximum and the brakes are completely released to an emergency position at another extreme in which brake pipe pressure is minimal and the brakes are fully applied. The brake handle positions thus include brake release, minimum service brake application, full service brake application and emergency brake application. When the brakes are released, the reservoirs and the brake pipe are generally charged to the same pressure: typically 90 psi on a freight train and 110 psi on a passenger train. When the brakes are applied, the pressure in the brake pipe is reduced via a valve located in the lead locomotive. The exact amount by which the pressure is reduced depends into which of the application positions the brake handle is placed. It is this pressure reduction that signals the brake control valve on each railcar to supply pressurized air from the appropriate reservoir(s) to the brake cylinders. The brake cylinders convert this pressure to the mechanical force that the brake shoes apply to slow or stop the rotation of the wheels on the railcar. Assuming the brake signal is successfully communicated throughout the train, the brakes of all railcars in the train respond in generally the same manner.

Figure 1:
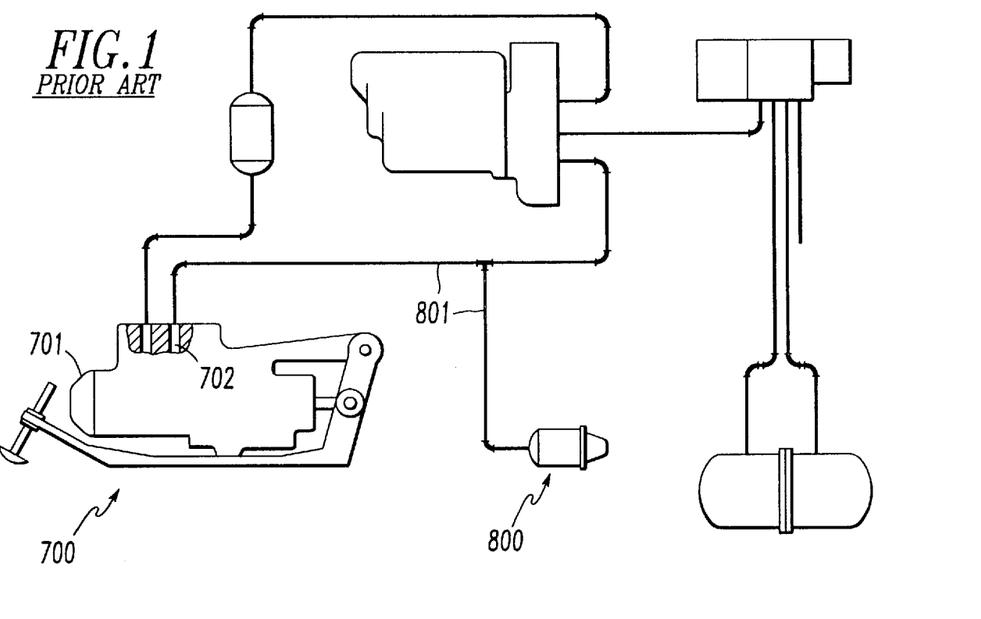
FIG. 1 is a schematic diagram of air brake equipment for a typical freight railcar including an S-1 load sensor valve.

FIG. 1 illustrates a schematic diagram of the air brake equipment of a typical freight railcar equipped with empty and load brake equipment. The air brake equipment typically includes one or more brake cylinders, an emergency air reservoir, an auxiliary air reservoir and an "ABD" or similar type pneumatic brake control valve. The operation of the pneumatic control valve as well as a description of its components is provided in the aforementioned copending application.

Each freight railcar may include empty and load brake equipment such as a P-1 load proportional valve and an S-1 type or an ELX type load sensor valve all of which are made by the Westinghouse Air Brake Company (WABCO) and are well known in the brake control art. The objective of empty and load brake equipment is to reduce braking on the railcar if it is empty and to permit heavier braking on the railcar if it is loaded. On a freight train with railcars equipped with empty and load brake equipment, the braking is more uniformly applied throughout the train in accordance with the load borne by the railcars. This tends to reduce the slack between adjacent railcars and improves overall handling of the freight train.

Regarding the operation of a load sensor valve, the S-1 load sensor valve, for example, automatically senses whether the railcar is loaded or empty generally by measuring the relationship between the body of the railcar and the top of the side frame of the truck. Each railcar typically has two trucks, one at each end. Each truck includes the wheels and axles and other parts that together form the structure that supports the body of the railcar. Suspension springs are used to dampen vibrations that would otherwise be transmitted from the wheels to the railcar body and that may otherwise damage the load being transported. These suspension springs deflect or compress to an extent proportional to the weight of the load carried by the railcar.

Typically mounted to the underside of the railcar body, the S-1 load sensor valve uses its sensor arm to measure the distance between the railcar body and the top of the truck side frame. When loaded, the railcar body further compresses the springs thereby reducing the distance between the railcar body and the truck side frame. The distance that the sensor arm can travel is therefore limited. Conversely, when the railcar is empty, the springs are less compressed thereby maximizing the distance between the railcar body and the truck side frame. The distance that the sensor arm can travel is then at its maximum.

When the S-1 load sensor senses that the railcar is empty, its internal mechanism serves to regulate the flow of air to the P-1 load valve. When the railcar is empty, the P-1 load proportional valve controls the flow of air to the brake cylinder so that the brake cylinder pressure is approximately 60% of what it would be if the railcar were loaded no matter how much the pressure is reduced in the brake pipe. During brake applications, the equalizing volume is used to maintain a satisfactory relationship between pressure in the empty and load brake equipment and that in the control valve and its reservoirs when the railcar is empty. Empty and load brake equipment such as the type alluded to in this document is described in U.S. Pat. Nos. 5,005,915 and 5,100,207. These patents are assigned to the assignee of the present invention, and their teachings are incorporated into the present document by reference.

Figure 2:
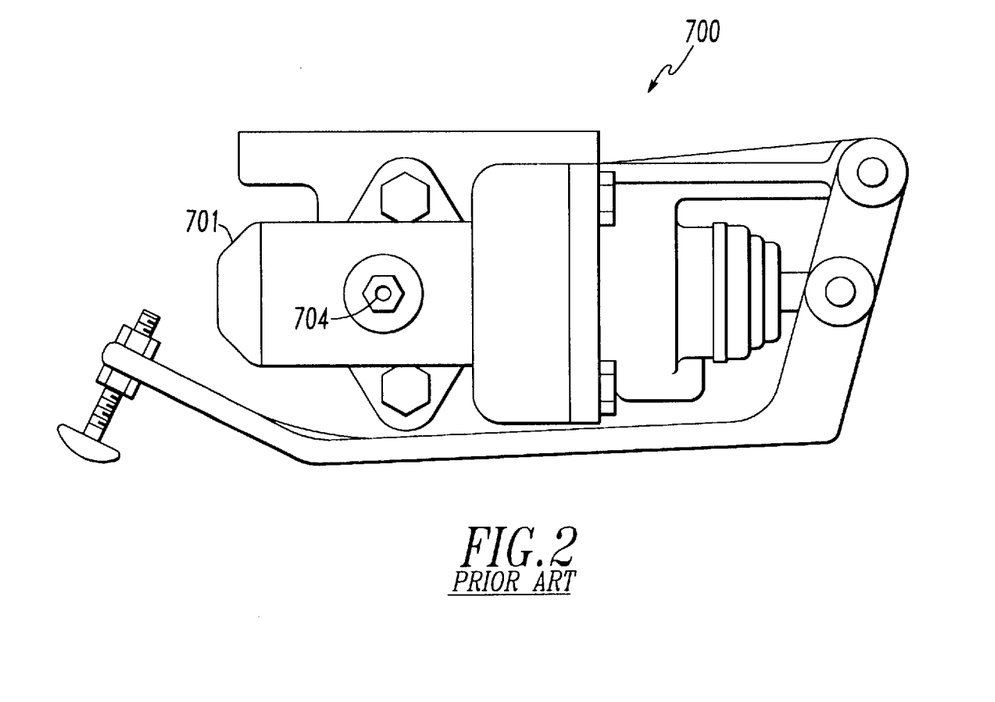

Whether of the S-1 type or ELX type, the load sensor valve features one or more internal chambers or passageways. An interconnecting pipe connects at least one of these chambers or passageways to the brake cylinder as shown, for example, in the schematic diagram of FIG. 1. An S-1 load sensor valve of the type shown schematically in FIG. 1 is illustrated in FIG. 2. The left side of the housing of the load sensor valve features a generally cylindrical portion flanked by two bolts. Between these bolts and screwed into a threaded bore in the cylindrical portion is a pipe plug. Removal of the pipe plug provides direct access to the chamber that communicates with the brake cylinder via the interconnected pipe shown in FIG. 1. The threaded bore in the housing can thus be used as an access port through which to access the pressure in the brake cylinder from the load sensor valve.

The American Association of Railroads (A.A.R.) has proposed that each railcar of a freight train be provided with a mechanism that would allow the pressure within the brake cylinder to be read quickly. At present, the A.A.R. is considering whether to issue a specification requiring that a commercially available quick connect type fitting be used to access the pressure within the brake cylinder. The disadvantage of such a fitting, however, is that it provides only a single seal with which to contain the pressure to be measured. That is, while such a fitting is not being used to access the pressure, it offers only one seal to prevent leakage of the pressure that it is supposed to contain. Unless the fitting is routinely covered to protect the seal when the fitting is not being used to access the brake cylinder pressure, the seal is exposed to dust, dirt and/or other potential contaminants. It is, of course, important that such a fitting prevent leakage of pressure from the brake cylinder otherwise operation of the brakes may be adversely affected.

It should be noted that the foregoing background information is provided to assist the reader in understanding the instant invention. Accordingly, any terms used herein are not intended to be limited to any particular narrow interpretation unless specifically stated otherwise in this document.

OBJECTIVES OF THE INVENTION

It is, therefore, a primary objective of the invention to provide a highly reliable fitting that allows the pressure within a brake cylinder of a railcar to be measured quickly.

Another objective is to render the pressure within the brake cylinder quickly measurable with a fitting that features two seals so if one seal should leak the other seal will prevent leakage of the air that the fitting is supposed to contain.

Yet another objective is to endow such fitting with a male portion of a commercially available quick connect fitting so that the pressure within the brake cylinder can be measured quickly by mating the male portion with a corresponding female portion which has attached at its other end a pressure measuring device.

Still another objective of the invention is to provide such a dual seal coupling fitting to enable quick measurement of pressure within any other type of piping or vessel capable of holding air or other type of suitable fluid under pressure.

In addition to the objectives and advantages listed above, various other objectives and advantages of the invention will become more readily apparent to persons skilled in the relevant art from a reading of the detailed description section of this document. The other objectives and advantages will become particularly apparent when the detailed description is considered along with the attached drawings and with the appended claims.

SUMMARY OF THE INVENTION

In a presently preferred embodiment, the invention provides a dual seal coupling fitting for enabling quick measurement of brake cylinder pressure through a housing of a load sensor valve. The housing defines a chamber in communication with a brake cylinder of a railcar and a threaded bore in communication with the chamber. The dual seal coupling fitting includes a valve body, a primary valve and a secondary valve. The valve body has a protruding end that is shaped like a male portion of a quick connect coupling and a threaded end that is screwable into the threaded bore of the housing. The valve body defines a passage with a first cylindrical section thereof communicating with a second cylindrical section thereof. The primary valve is situated in the first cylindrical section, the secondary valve in the second cylindrical section. The primary valve includes a valve stem with a poppet type head that is seatable against an outer valve seat formed in the protruding end. A first means compresses the poppet type head against the outer valve seat so that the primary valve is normally closed to prevent leakage of the pressure from the housing. The secondary valve features a cylindrical seat piece and a retainer. The cylindrical seat piece sealingly secures within the second cylindrical section and defines through itself an inner bore. The cylindrical seat piece at one end forms an inner valve seat and at an opposite end situates adjacent to the first means. The retainer has at one end a stem post that contacts a terminal end of the valve stem within the inner bore of the seat piece. The retainer also has a check type valve retained within an annular recess defined in the retainer about a base of the stem post. A second means compresses the check type valve against the inner valve seat so that the secondary valve is normally closed to prevent leakage of the pressure from the housing. When a female portion of a quick connect coupling is mated with the male portion of the fitting, the primary and secondary valves both open as connecting the female portion causes both the first and second means to compress further. This allows air to flow through the passage and enables quick measurement of the pressure within the housing via a pressure measuring device attached to an opposing end of the female portion.

BRIEF DESCRIPTION OF THE DRAWINGS

FIG. 2 is a side view of the S-1 load sensor valve shown schematically in FIG. 1a.

DETAILED DESCRIPTION OF THE INVENTION

Before describing the invention in detail, the reader is advised that, for the sake of clarity and understanding, identical components having identical functions in each of the accompanying drawings have been marked where possible with the same reference numerals in each of the Figures provided in this document.

FIGS. 1 and 2 each illustrate a housing 701 of an S-1 load sensor valve 700. The housing 701 defines a chamber or internal passageway 702 that communicates with a brake cylinder 800 of a railcar. Typically, an interconnecting pipe 801 connects the chamber 702 to the brake cylinder 800. The housing 701 also defines a threaded bore 703 that communicates with the chamber 702, as best shown in FIG. 2. Removing a pipe plug 704 from threaded bore 703 provides direct access to chamber 702. The threaded bore 703 can thus be used as an access port through which to access the pressure in the brake cylinder from the S-1 load sensor valve.

FIGS. 3, 3*a–g* and 4 illustrate the essential details of a presently preferred embodiment of the present invention. The dual seat coupling, fitting generally designated 100, of this invention enables quick measurement of the brake cylinder pressure within the housing of an S-1 type or an ELX type load sensor valve or load sensor valves made by various other railroad equipment manufacturers. It should be apparent from a reading of this document, however, that the dual seal coupling fitting 100 described and claimed herein can, of course, be applied to any other type of housing, piping or vessel capable of holding air or other suitable fluid under pressure.

Figure 3:
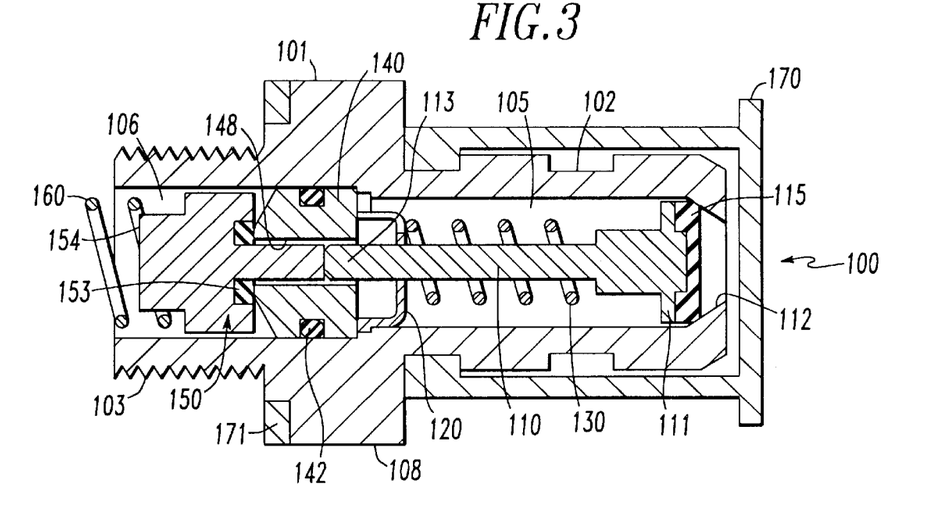
FIG. 3 is a cross-sectional view of a dual seal coupling fitting according to the present invention.

The dual seal coupling fitting 100 basically includes a valve body 101, a valve stem 110, a spring retainer or stop 120, a first spring 130, a cylindrical seat piece 140, a check valve retainer 150 and a second spring 160. The valve body 101 has a protruding end 102 that is shaped like a male portion of a quick connect coupling and a threaded end 103 that is screwable into the threaded bore 703 of any suitable housing such as that of the S-1 load sensor valve 700. The valve body 101 defines a passage with a first cylindrical section 105 thereof communicating with a second cylindrical section 106 thereof. An outer valve seat 112 is formed within the passage at or near the opening of the protruding end.

The valve stem 110 is situated primarily within the first cylindrical section 105 of fitting 100 as shown in FIG. 3. The valve stem 110 has at its head end 111 a poppet valve 115. The poppet valve 115 may be composed of rubber or any other suitable sealing material. The poppet valve 115 is moveable within the first cylindrical section 105 and is seatable against the outer valve seat 112. The valve stem 110 also has a terminal end 113.

The spring stop 120 is secured to the cylindrical wall of the passage approximately between the first and second cylindrical sections 105 and 106. Also between the first and second cylindrical sections 105 and 106, the cylindrical wall of the passage may define an annular groove 104. The spring stop 120 has three petals 121 each of which have a projecting lip 122. Collectively, the projecting lips 122 act as a flange or projecting rim that can secure the spring stop 120 within annular groove 104. The first spring 130 is disposed concentrically about the valve stem 110 between the spring stop 120 and the underside of the head end 111 of valve stem 110. When seated against the outer valve seat 112, the poppet valve 115 serves as a primary seal that prevents leakage of the air pressure from the housing.

The cylindrical seat piece 140 features an annular groove 141 around its circumference in which it retains an o-ring 142. It is with this o-ring 142 that the cylindrical seat piece 140 is sealingly secured within the second cylindrical section 106. One end of seat piece 140 is shaped as an inner valve seat 145 and its opposite end 146 is situated adjacent to the spring stop 120. Along its longitudinal axis, the seat piece 140 also defines through itself an inner bore 148. This inner bore 148 receives the terminal end 113 of the valve stem 110 as shown in FIG. 3.

The check valve retainer 150 is also situated in the second cylindrical section 106 of the valve body 101. Generally cylindrical in shape, the retainer 150 has protruding from one end a stem post 151. The stem post 151 lies approximate to the terminal end 113 of the valve stem 110 within the inner bore 148 of the cylindrical seat piece 140. At the base of the stem post 151, the check valve retainer 150 defines an annular recess 152 in which it retains an annular check valve 153. The annular check valve 153 may be composed of rubber or any other suitable sealing material. Preferably, there is a clearance of approximately twenty one thousands of an inch between the stem post 151 and the terminal end 113 so as to reduce the likelihood of bead-in against the annular check valve 153. When seated against the inner valve seat 145, the annular check valve 153 serves as a secondary seal that further prevents leakage of the air from the pressure bearing housing.

The second spring 160 is secured at one end to an opposite end 154 of the check valve retainer 150. Preferably, the opposite end 154 of retainer 150 takes the form of a cylindrical shaft to which the second spring 160 secures concentrically. The valve body 101 includes a hexagonal portion 108 between the protruding and threaded ends 102 and 103 to accommodate a wrench with which to screw securely the fitting 100 into the threaded bore 703. When the threaded end 103 is screwed into a suitable housing, the second spring 160 compresses annular check valve 153 against the inner valve seat 145 of the cylindrical seat piece 140.

The dual seal coupling fitting 100 thus features both a primary valve and a secondary valve to prevent leakage of the brake cylinder pressure when the male portion of the quick connect coupling sits unmated. Normally compressed against the outer valve seat 112, the poppet valve 115 serves as the primary valve as it lies farthest away from the housing. Similarly, the annular check valve 153 lies normally compressed against its inner valve seat 145 of cylindrical seat piece 140. Annular check valve 153 thus serves as the secondary valve as it lies closest to the housing.

Mating a female portion of a quick connect coupling to the protruding end 102 of the dual seal coupling fitting 100 simultaneously causes the poppet valve 115 to move away from the outer valve seat 112 and the check valve 153 to move away from the inner valve seat 145. Specifically, when mated with the male portion, the female portion (not shown) pushes the poppet valve 115 away from the outer valve seat 112 thereby compressing the first spring 130 between the spring stop 120 and the encroaching underside of the head end 111 of valve stem 110. This forces the terminal end 113 of valve stem 110 against the stem post 151 of check valve retainer 150 thereby pushing check valve 153 away from the inner valve seat 145 and compressing second spring 160 between the opposite end 154 of retainer 150 and the base of the threaded bore 703 of the housing.

Figure 3A:
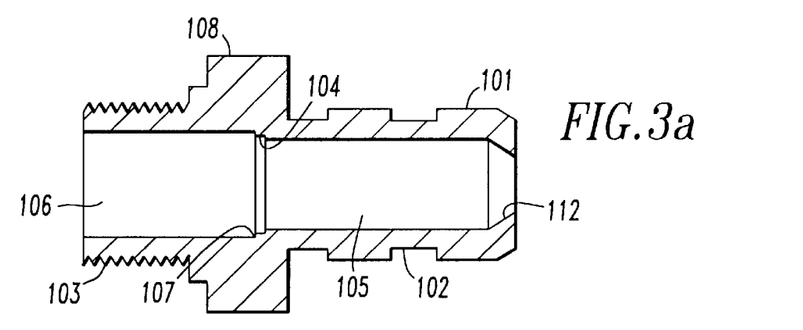
FIG. 3a is a cross-sectional view of the dual seal coupling fitting shown in FIG. 3 absent its internal components.
Figure 3B:
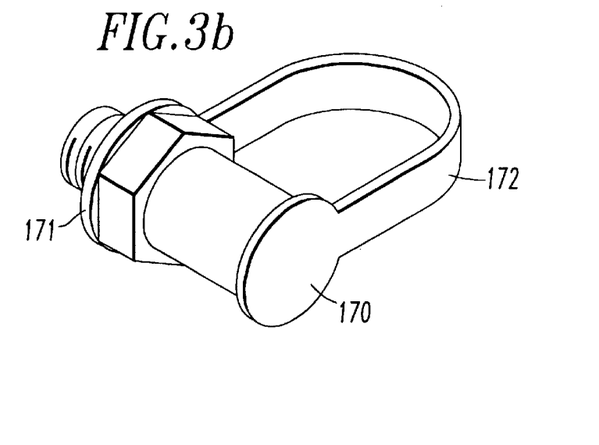
FIG. 3b is a perspective view of the dual seal coupling fitting illustrated in FIG. 3 with the protective cap attached.
Figure 3C:
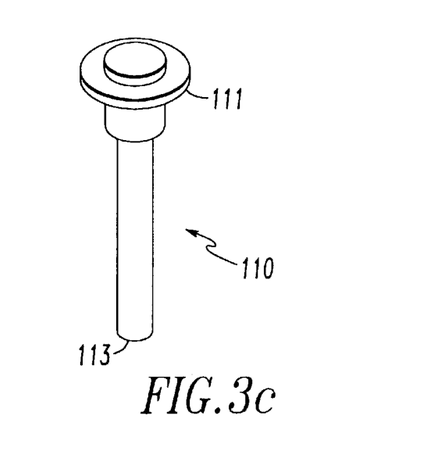
FIG. 3c is a perspective view of a valve stem for the dual seal coupling fitting shown in FIG. 3.
Figures 3D, 3E, 3F, 3G:
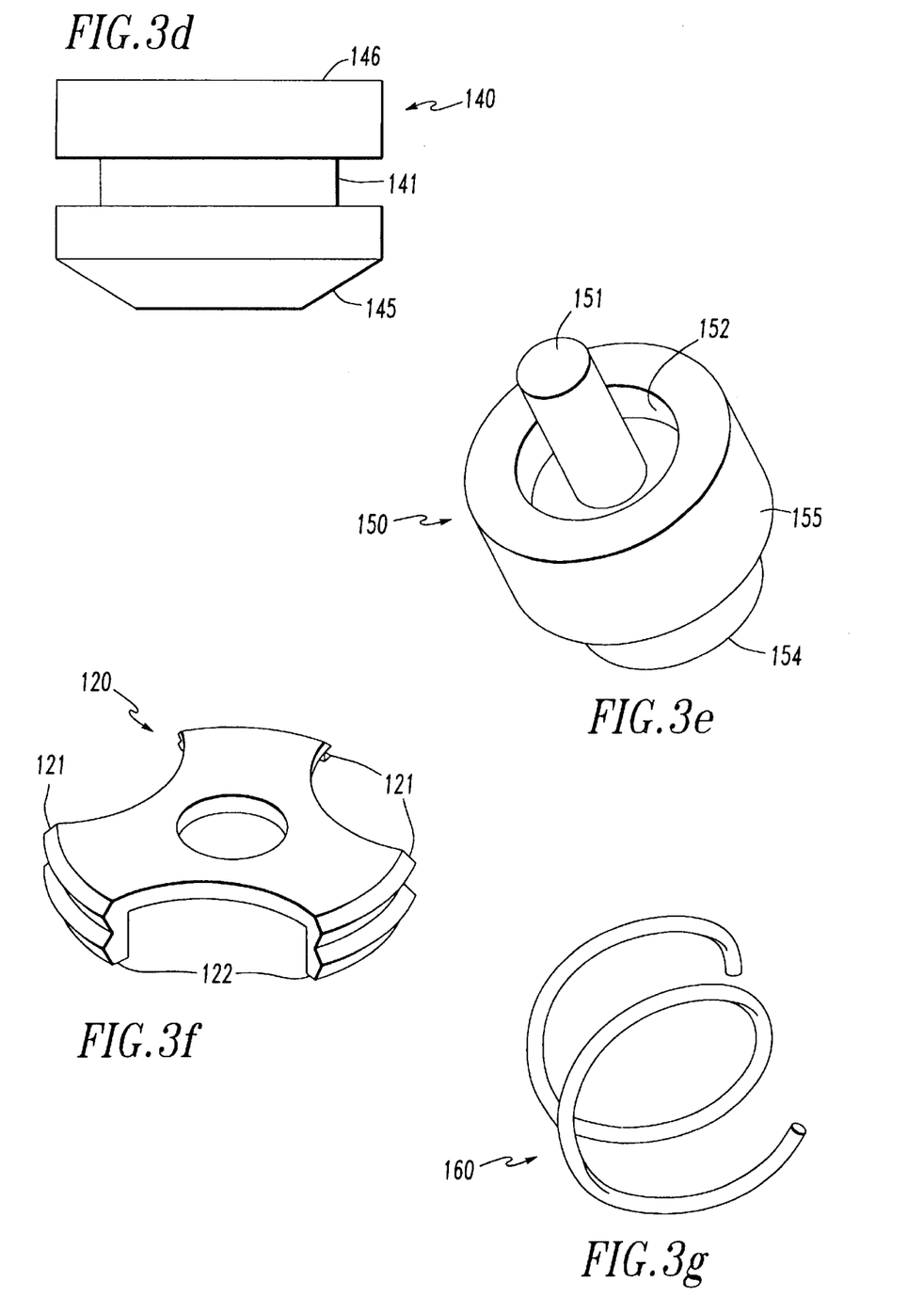
FIG. 3d is a side view of a check valve seat for the dual seal coupling fitting shown in FIG. 3.
FIG. 3e is a perspective view of a check valve retainer for the dual seal coupling fitting shown in FIG. 3.
FIG. 3f is a perspective view of a spring retainer for the dual seal coupling fitting shown in FIG. 3.
FIG. 3g is a perspective view of a check valve spring for the dual seal coupling fitting shown in FIG. 3.
Figure 4:
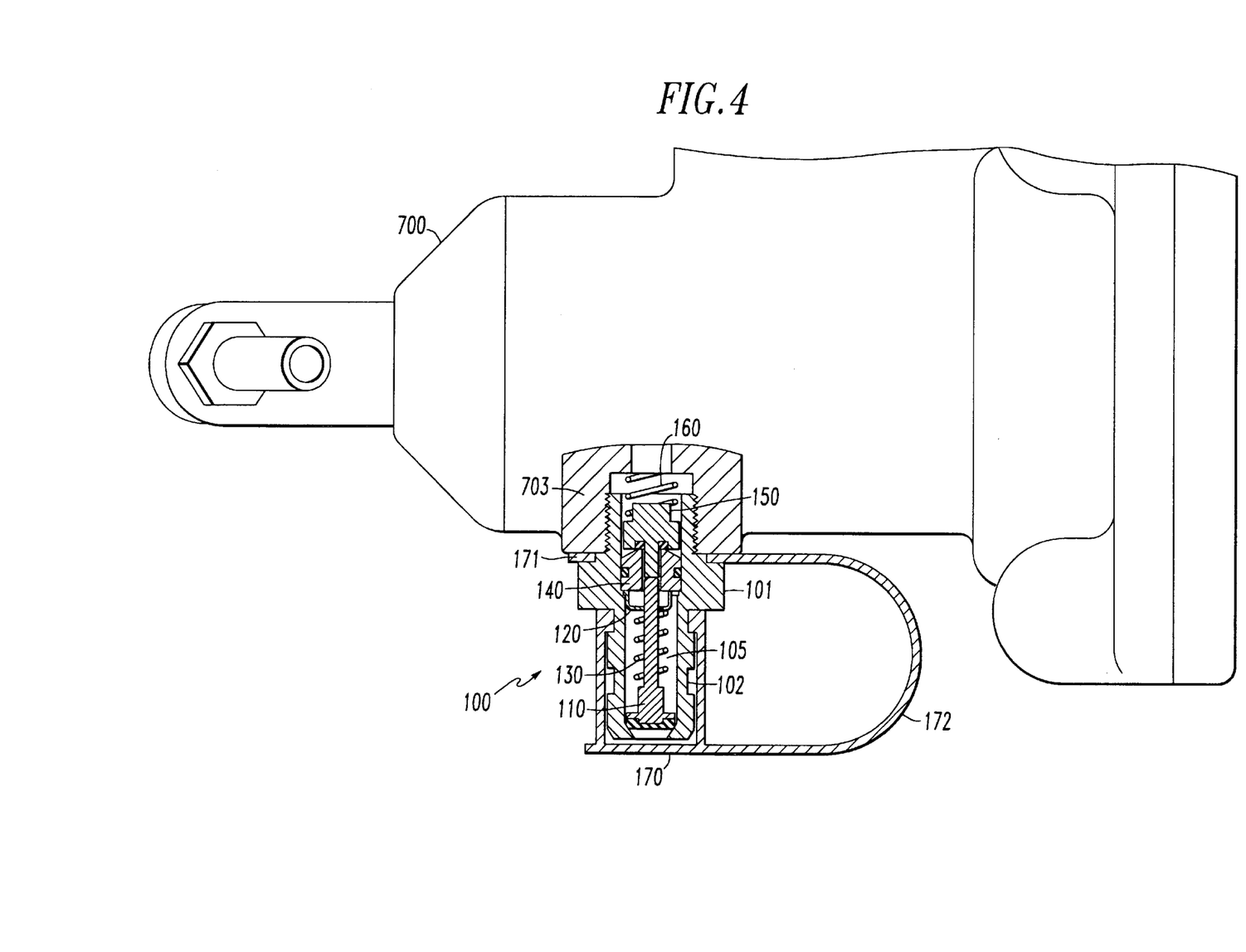
FIG. 4 is a cross-sectional view of the dual seal coupling fitting connected to an S-1 load sensor valve.

With both the primary and secondary valves open, air is allowed to flow from the housing through the passage to the female portion of the quick connect coupling. Generally, the main section 155 of check valve retainer 150 has a diameter less than that of the second cylindrical section 106 in which it is housed. The stem post 151 of retainer 150 and the terminal end 113 of valve stem 110 likewise have diameters less than the inner bore 148 of seat piece 140 in which they can reciprocate. The petals 121 of spring stop 120 are spaced apart as shown in FIG. 3*f*. When the female portion is mated with the protruding 102 of the dual seal coupling fitting 100, air from the housing flows around retainer 150 through the secondary valve. The air continues flowing through the conical space between the cylindrical wall of the inner bore 148 and stem post 151 and terminal end 113 of valve stem 110 which the inner bore 148 contains. Finally, the air stream passes through the first cylindrical section 105 and emerges from the primary valve into the female portion of the quick connect coupling. Using a pressure measuring device connected to the opposing end of the female portion of the quick connect coupling, the pressure of the air contained within the housing can thus be quickly read.

The valve body 101 at its protruding end 102 is shaped to assume the form of a male portion of a quick connect coupling. There are, of course, a variety of quick connect couplings commercially available in the market place. The male portion of a standard, commercially available quick connect coupling, however, would have to be extensively modified to make the dual seal coupling fitting 100 of the present invention. For example, the male portion of a standard coupling would have to be modified to accommodate the secondary valve and its related components such as spring stop 120 and annular groove 104. This also includes using the cylindrical seat piece 140, with its inner valve seat 145 at its inner end, and second spring 160.

The check valve retainer 150 inclusive of its stem post 151, annular recess 152, annular check valve 153 and shaft to which second spring 160 concentrically attaches would also have to be accommodated by a standard male portion. Moreover, to accommodate the cylindrical seat piece 140 of a large diameter, the second cylindrical section 106 would have to be bored out even further so as to form a shoulder 107 in the valve body 101 between the first and second cylindrical sections 105 and 106. Therefore, not only would the cylindrical seat piece 140 be tightly sealed within the second cylindrical section 106 by its o-ring 142, it would also be secured at its opposite end against the shoulder 107 adjacent to spring stop 120. The shoulder 107 and annular groove 104 are best shown in FIG. 3a.

The position of the primary valve renders it most exposed to dust, dirt and/or other potential contaminants. The secondary valve thus serves as a backup to the primary valve should the poppet valve 115 succumb to such contaminants or otherwise degrade. Conversely, should the annular check valve 153 degrade, the primary valve acts as the backup seal to prevent leakage of pressure from the housing when the male portion lies unmated.

A protective cap 170 may also be used to cover the protruding end 102 of fitting 100 to protect it from such contaminants when it is not being used. As best shown in FIGS. 3 and 3b, a washer 171 can be placed around the threaded end 103 of the housing. When the threaded end 103 is screwed into the threaded bore of the housing, the washer 171 is secured between an accommodating base of the hexagonal portion 108 and the housing. A strap 172 can be used to connect the washer 171 to the protective cap 170, as shown in FIG. 3b, to reduce the likelihood of losing or misplacing the cap 170.

It should be apparent that the male and female portions of the quick connect coupling may be switched. Specifically, the female portion, rather than the male portion, of the coupling may be designed to screw into the threaded bore of the housing. More important is that the female portion would have to be modified in the aforementioned manner to accommodate all of the aforementioned components such as spring stop 120, cylindrical seat piece 140, check valve retainer 150 and second spring 160. The male portion, rather than the female portion, of the quick connect coupling would then be attached at its opposite end to the pressure measuring device to measure the pressure within the housing when the male and female portions of the quick connect coupling are mated.

The dual seal coupling fitting 100 allows the pressure within the brake cylinder to be measured quickly according to the specification imposed by the A.A.R. Even though the specification requires that the brake cylinder pressure be made amenable to quick measurement, the invention maintains the overall integrity of the air brake equipment on the railcar by the primary and secondary valves that prevent leakage of air from the S-1 load sensor valve 700. The dual seal coupling fitting 100 described and claimed in this document can, of course, be applied to any other type of housing, piping or vessel capable of holding air or other type of suitable fluid under pressure.

The presently preferred embodiment for carrying out the invention has been set forth in detail according to the Patent Act. Those persons of ordinary skill in the art to which this invention pertains may nevertheless recognize various alternative ways of practicing the invention without departing from the spirit and scope of the appended claims. Those of such skill will also recognize that the foregoing description is merely illustrative and not intended to limit any of the ensuing claims to any particular narrow interpretation.

Accordingly, to promote the progress of science and useful arts, we secure for ourselves by Letters Patent exclusive rights to all subject matter embraced by the following claims for the time prescribed by the Patent Act.

We claim:

1. A dual seal coupling fitting for enabling quick measurement of brake cylinder pressure through a housing of a load sensor valve, such housing defining a chamber in communication with a brake cylinder of a railcar and a threaded bore in communication with such chamber, said dual seal coupling fitting comprising:

(a) a valve body having a protruding end shaped as a male portion of a quick connect coupling and a threaded end for screwing into such threaded bore, said valve body defining a passage therethrough with a first cylindrical section of said passage communicating with a second cylindrical section of said passage;

(b) a valve stem having at a head end thereof a poppet valve moveable within said first cylindrical section for seating against an outer valve seat formed in said protruding end;

(c) a spring stop secured approximately between said first and said second cylindrical sections;

(d) a first spring disposed concentrically about said valve stem between said spring stop and said head end of said valve stem so that said poppet valve is compressed against said outer valve seat to provide a primary seal that prevents leakage of such pressure;

(e) a cylindrical seat piece at one end formed as an inner valve seat and at an opposite end situated adjacent to said spring stop, said seat piece defining (i) an inner bore therethrough for receiving a terminal end of said valve stem and (ii) an annular groove circumferentially around said seat piece for retaining an o-ring to seal said cylindrical seat piece within said second cylindrical section adjacent to said spring stop;

(f) a check valve retainer having at one end thereof a stem post within said inner bore approximate to said terminal end of said valve stem and defining an annular recess about a base of said stem post for retaining an annular check valve; and (g) a second spring having one end secured to an opposite end of said check valve retainer such that when said threaded end of said fitting is screwed into such threaded bore of such housing said second spring compresses said annular check valve against said inner valve seat to provide a secondary seal that also prevents leakage of such pressure such that mating a female portion of a quick connect coupling to said male portion causes said poppet valve to move away from said outer valve seat and said check valve to move away from said inner valve seat thereby allowing flow through said passage and enabling quick measurement of such pressure within such housing via a pressure measuring device attached to an opposing end of such female portion.

2. The dual seal coupling fitting recited in claim 1 wherein said second spring secures concentrically to a shaft formed as part of said opposite end of said check valve retainer.

3. The dual seal coupling fitting recited in claim 1 wherein said opposite end of said cylindrical seat piece abuts against a shoulder formed in said valve body within said passage due to said first cylindrical section being of smaller diameter than said second cylindrical section.

4. The dual seal coupling fitting recited in claim 1 wherein a flange of said spring stop secures said spring stop against an annular groove formed in said valve body within said passage between said first and said second cylindrical sections.

5. A dual seal coupling fitting for enabling quick measurement of pressure contained within a housing, said fitting comprising:
   (a) a valve body having a protruding end shaped as a male portion of a quick connect coupling and a threaded end for screwing into a threaded bore of such housing, said valve body defining a passage therethrough with a first cylindrical section of said passage communicating with a second cylindrical section of said passage;
   (b) a valve stem having at a head end thereof a poppet valve moveable within said first cylindrical section for seating against an outer valve seat formed in said protruding end;
   (c) a spring stop secured approximately between said first and said second cylindrical sections;
   (d) a first spring disposed concentrically about said valve stem between said spring stop and said head end of said valve stem so that said poppet valve is compressed against said outer valve seat to provide a primary seal that prevents leakage of such pressure;
   (e) a cylindrical seat piece at one end formed as an inner valve seat, at an opposite end situated adjacent to said spring stop, and defining an inner bore therethrough for receiving a terminal end of said valve stem, said cylindrical seat piece sealed within said second cylindrical section adjacent to said spring stop;
   (f) a check valve retainer having at one end thereof a stem post within said inner bore approximate to said terminal end of said valve stem and defining an annular recess about a base of said stem post for retaining an annular check valve; and
   (g) a second spring having one end secured to an opposite end of said check valve retainer such that when said threaded end of said fitting is screwed into such threaded bore of such housing said second spring compresses said annular check valve against said inner valve seat to provide a secondary seal that prevents leakage of such pressure such that mating a female portion of a quick connect coupling to said male portion of said fitting causes said poppet valve to move away from said outer valve seat and said check valve to move away from said inner valve seat thereby allowing flow through said passage and enabling quick measurement of such pressure contained within such housing via a pressure measuring device attached to an opposing end of such female portion.

6. The dual seal coupling fitting recited in claim 5 wherein a flange of said spring stop secures said spring stop against an annular groove formed in said valve body within said passage between said first and said second cylindrical sections.

7. The dual seal coupling fitting recited in claim 5 wherein said second spring secures concentrically to a shaft formed as part of said opposite end of said check valve retainer.

8. The dual seal coupling fitting recited in claim 5 wherein said cylindrical seat piece is sealed within said second cylindrical section by an o-ring retained within an annular groove defined circumferentially in said cylindrical seat piece.

9. The dual seal coupling fitting recited in claim 5 wherein said opposite end of said cylindrical seat piece abuts against a shoulder formed in said valve body within said passage due to said first cylindrical section being of smaller diameter than said second cylindrical section.

10. The dual seal coupling fitting recited in claim 9 wherein a flange of said spring stop secures said spring stop against an annular groove formed in said valve body within said passage between said shoulder and said first cylindrical section.

11. The dual seal coupling fitting recited in claim 5 wherein said valve body features a hexagonal portion between said protruding and said threaded ends.

12. The dual seal coupling fitting recited in claim 5 further including a protective cap for covering said male portion of said quick connect coupling.

13. The dual seal coupling fitting recited in claim 11 further including:
   (a) a washer for placement around said threaded end of said fitting and securable between said hexagonal portion and such housing when said threaded end of said fitting is screwed into such threaded bore of such housing; and
   (b) a protective cap, connected via a strap to said washer, for covering said male portion of said quick connect coupling.

14. A dual seal coupling fitting for enabling quick measurement of pressure contained within a housing, said fitting comprising:
   (a) a valve body having a protruding end shaped as a male portion of a quick connect coupling and a threaded end for screwing into a threaded bore of such housing, said valve body defining a passage therethrough with a first cylindrical section of said passage communicating with a second cylindrical section of said passage;
   (b) a primary valve situated in said first cylindrical section, said primary valve including a valve stem with a poppet type head for seating against an outer valve seat formed in said protruding end;
   (c) a first means for compressing said poppet type head against said outer valve seat so that said primary valve is normally closed to prevent leakage of such pressure;
   (d) a secondary valve situated in said second cylindrical section, said secondary valve including a cylindrical seat piece and a retainer, said cylindrical seat piece sealingly secured within said second cylindrical section and at one end forming an inner valve seat and at an opposite end situated adjacent to said first means for compressing, said retainer having at one end a stem post approximate to a terminal end of said valve stem within an inner bore defined through said seat piece and a check type valve retained within an annular recess defined in said retainer about a base of said stem post; and (e) a second means for compressing said check type valve against said inner valve seat so that said secondary valve is normally closed to prevent leakage of such pressure; such that mating a female portion of a quick connect coupling to said protruding end of said fitting causes said first and said second means for compressing to compress further thereby opening both said primary and said secondary valves, allowing flow through said passage and enabling quick measurement of such pressure contained within such housing via a pressure measuring device attached to an opposing end of such female portion.

15. The dual seal coupling fitting recited in claim 14 wherein said first means for compressing includes:

(a) a spring stop secured approximately between said first and said second cylindrical sections; and (b) a first spring disposed concentrically about said valve stem between said spring stop and said poppet type head of said valve stem to compress said poppet type head against said outer valve seat.

16. The dual seal coupling fitting recited in claim 15 wherein a flange of said spring stop secures said spring stop against an annular groove formed in said valve body within said passage between said first and said second cylindrical sections.

17. The dual seal coupling fitting recited in claim 16 wherein said cylindrical seat piece is sealed within said second cylindrical section by an o-ring retained within an annular groove defined circumferentially in said cylindrical seat piece and said opposite end of said cylindrical seat piece abuts against said spring stop.

18. The dual seal coupling fitting recited in claim 14 wherein said second means for compressing includes a second spring having one end secured concentrically to a shaft formed as part of an opposite end of said retainer such that when said threaded end of said fitting is screwed into such threaded bore of such housing said second spring compresses said check type valve against said inner valve seat.

19. The dual seal coupling fitting recited in claim 14 wherein said valve body features a hexagonal portion between said protruding and said threaded ends.

20. The dual seal coupling fitting recited in claim 14 further including a protective cap for covering said male portion of said quick connect coupling.

21. The dual seal coupling fitting recited in claim 19 further including:

(a) a washer for placement around said threaded end of said fitting and securable between said hexagonal portion and such housing when said threaded end of said fitting is screwed into such threaded bore of such housing; and (b) a protective cap, connected via a strap to said washer, for covering said male portion of said quick connect coupling.

* * * * *